(12) United States Patent
Tsai et al.

(10) Patent No.: US 10,761,896 B2
(45) Date of Patent: Sep. 1, 2020

(54) SYSTEM AND METHOD OF LIGHTWEIGHT DECENTRALIZED NFV ORCHESTRATION

(71) Applicant: CISCO TECHNOLOGY, INC., San Jose, CA (US)

(72) Inventors: Chiajen Tsai, Cupertino, CA (US); Ganesh Sundaram, San Jose, CA (US); Muthumayan Madhayyan, San Jose, CA (US); Chunhui Wong, Santa Clara, CA (US); Larry T. Chang, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 165 days.

(21) Appl. No.: 15/608,195

(22) Filed: May 30, 2017

(65) Prior Publication Data

US 2018/0239647 A1 Aug. 23, 2018

Related U.S. Application Data

(60) Provisional application No. 62/462,050, filed on Feb. 22, 2017.

(51) Int. Cl.
| | |
|---|---|
| *G06F 15/173* | (2006.01) |
| *G06F 9/50* | (2006.01) |
| *H04L 12/24* | (2006.01) |
| *H04L 29/08* | (2006.01) |
| *H04L 29/06* | (2006.01) |

(52) U.S. Cl.
CPC ........ *G06F 9/5077* (2013.01); *H04L 41/0893* (2013.01); *H04L 41/5051* (2013.01); *H04L 67/10* (2013.01); *H04L 69/03* (2013.01)

(58) Field of Classification Search
CPC ... G06F 9/5077; H04L 41/0893; H04L 67/10; H04L 41/5051; H04L 69/03; H04L 45/00
USPC ....... 709/223, 226, 230, 232, 235, 238, 243; 370/229, 230, 252, 254; 707/705, 706, 707/711
See application file for complete search history.

(56) References Cited

U.S. PATENT DOCUMENTS

| | | |
|---|---|---|
| 7,823,190 B1 | 10/2010 | Kacarov et al. |
| 9,491,201 B2 | 11/2016 | Bagepalli et al. |

(Continued)

FOREIGN PATENT DOCUMENTS

WO WO-2016050270 A1 * 4/2016 ......... G06F 9/44505

OTHER PUBLICATIONS

Toffetti, G., et al., "An Architecture for Self-Managing Microservices," AIMC15, Apr. 15, 2015, 6 pages; http://pd.zhaw.ch/publikation/upload/211458.pdf.

(Continued)

*Primary Examiner* — Dustin Nguyen
*Assistant Examiner* — Hao H Nguyen
(74) *Attorney, Agent, or Firm* — Polsinelli PC

(57) ABSTRACT

In one embodiment, a network functions virtualization infrastructure can be managed in a decentralized fashion. A front end can receive a request to provision a virtualized network function. The front end can create service descriptors for the request according to the virtualized network function, the service descriptors comprising a hierarchy of information elements organized based on distributed back-end agents operable to provision and manage the virtualized network function. The front end can store the service descriptors in a distributed data store.

20 Claims, 7 Drawing Sheets

(56) References Cited

U.S. PATENT DOCUMENTS

| | | | |
|---|---|---|---|
| 9,521,147 B2 | 12/2016 | Barton et al. | |
| 2014/0334488 A1* | 11/2014 | Guichard | H04L 69/22 |
| | | | 370/392 |
| 2015/0082308 A1* | 3/2015 | Kiess | G06F 9/5072 |
| | | | 718/1 |
| 2016/0142387 A1 | 5/2016 | Lockhart et al. | |
| 2017/0346704 A1* | 11/2017 | Strijkers | G06F 9/5005 |
| 2017/0373931 A1* | 12/2017 | Liu | H04L 29/02 |
| 2018/0004576 A1* | 1/2018 | Gokurakuji | G06F 9/45558 |

OTHER PUBLICATIONS

Han, B., et al., "Network Functions Virtualisation (NFV); Terminoogy for Main Concepts in NFV," ETSI GS NFV 003, V1.1.1 2013, 10 pages.

Chiosi M., et al., "Network Functions Virtualisation: An Introduction, Benefits, Enablers, Challenges & Call for Action," Introductory White Paper, SDN and OpenFlow World Congress, Oct. 22, 2012, 16 pages; https://portal.etsi.org/NFV/NFV_White_Paper.pdf.

"Scalable Orchestration With a Hierarchy of Domain-Focused Orchestrators," Nokia White Paper—NFV Insights Series, Oct. 2016, 11 pages.

Howard, M., "The Evolution of SDN and NFV Orchestration," Infonetics Research Special Report, Feb. 2015, 13 pages.

\* cited by examiner

SYSTEM AND METHOD OF LIGHTWEIGHT DECENTRALIZED NFV ORCHESTRATION

PRIORITY DATA

This is a non-provisional application of US Provisional Patent Applications entitled "SYSTEM AND METHOD OF LIGHTWEIGHT DECENTRALIZED NFV ORCHESTRATION" filed on Feb. 22, 2017 with Ser. No. 62/462,050. The US Provisional application is hereby incorporated herein in its entirety.

TECHNICAL FIELD

This disclosure relates in general to the field of communications and, more particularly, to systems and methods for lightweight decentralized network function virtualization (NFV) orchestration.

BACKGROUND

Network functions virtualization (NFV) represents a paradigm where network functions are run (or virtualized) on general-purpose hardware. The general-purpose hardware can be configured with a network function (rather than using custom hardware appliance), and the hardware are networked together to form a desired network topology. Virtualizing network functions, such as routing, firewalls, packet filtering, load balancing, etc., means that network administrators no longer have to provision physical custom networking hardware. Rather, network administrators can deploy virtualized network functions over generic physical resources. In some cases, network administrators can deploy a mix of physical network functions and virtualized network functions. Network administrators can now implement a desired network in a flexible manner, and even in a more dynamic manner. Network operations are simplified; operational costs are lowered. However, orchestrating, i.e., managing, NFV infrastructure (NFVI) can be challenging.

BRIEF DESCRIPTION OF THE DRAWINGS

To provide a more complete understanding of the disclosure and features and advantages thereof, reference is made to the following description, taken in conjunction with the accompanying FIGURES, wherein like reference numerals represent like parts, in which.

DETAILED DESCRIPTION OF EXAMPLE EMBODIMENTS

Overview

Figure 1:
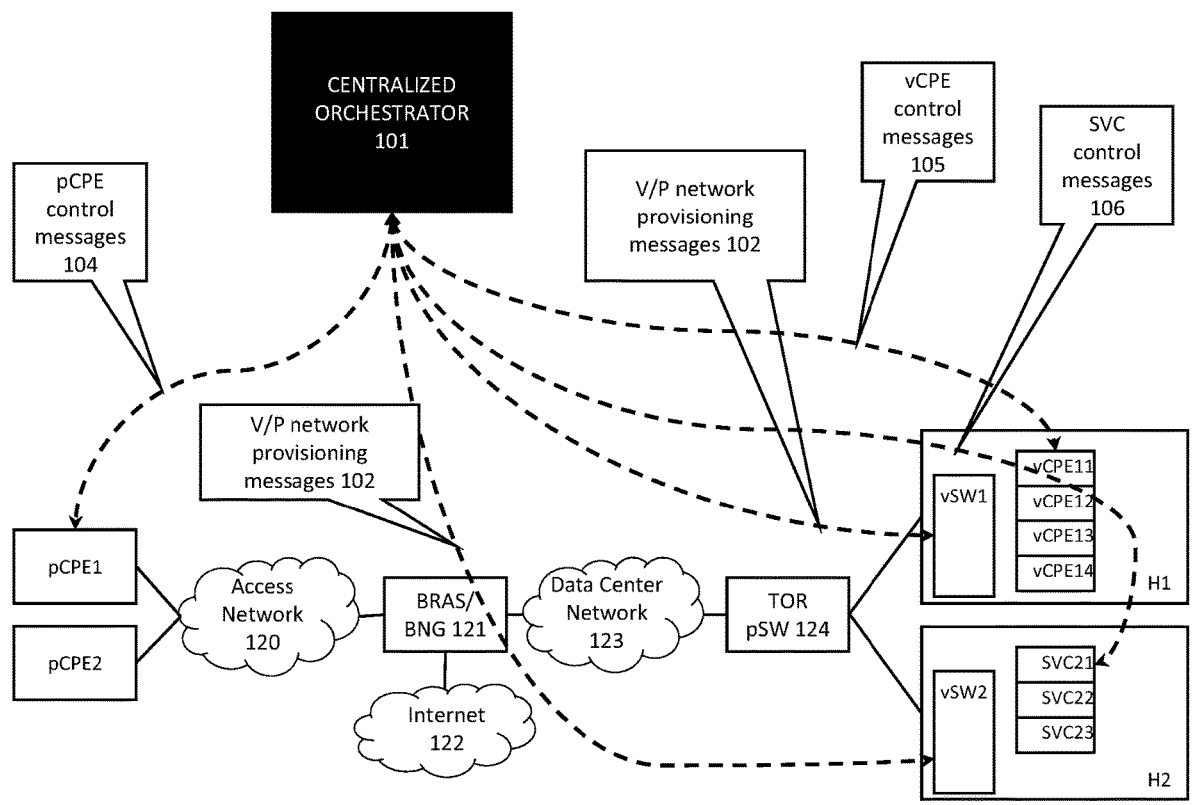
FIG. 1 illustrates an exemplary network functions virtualization infrastructure with centralized orchestration.

A network functions virtualization infrastructure can be managed in a decentralized fashion. A front end can receive a request to provision a virtualized network function. The front end can create service descriptors for the request according to the virtualized network function, the service descriptors comprising a hierarchy of information elements organized based on distributed back-end agents operable to provision and manage the virtualized network function. The front end can store the service descriptors in a distributed data store.

Back end agents can access and/or modify the service descriptors, and an event data pipeline implements the virtualized network function.

A decentralized NFV orchestration system can include a lightweight common service frontend, distributed agents, declarative data store, and event pipeline. The system can have one or more of the following advantages: asynchronous distributed control plan enables decoupling of traditional hub-spoke control flow into two-phase key store and agent operations, significant performance and scale improvement over centralized MANO solutions, ease of composition, customization and distribution with service descriptor and micro service container-based design, and extensible to hybrid environment with both container and VM based VNFs.

One aspect of the disclosure relates to computer-implemented methods for decentralized NFV orchestration.

In other aspects, systems for implementing the methods described herein are provided. Moreover, a computer program for carrying out the methods described herein, as well as a non-transitory computer readable storage-medium storing the computer program are provided. A computer program may, for example, be downloaded (updated) to the existing network devices and systems (e.g. to the existing routers, switches, various control nodes and other network elements, etc.) or be stored upon manufacturing of these devices and systems.

In other aspects, apparatuses comprising means for carrying out one or more of the method steps are envisioned by the disclosure.

As will be appreciated by one skilled in the art, aspects of the disclosure, in particular the functionalities related to decentralized NFV orchestration, may be embodied as a system, a method or a computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g., a microprocessor, of a computer. Furthermore, aspects of the disclosure may take the form of a computer program product embodied in one or more computer readable medium(s) having computer readable program code embodied, e.g., stored, thereon.

Example Embodiments

Understanding NFV Orchestration

The following foundational information may be viewed as a basis from which the disclosure may be properly explained. Such information is offered for purposes of explanation only and, accordingly, should not be construed in any way to limit the broad scope of the disclosure and its potential applications.

Network function virtualization has several components. Virtualized network functions (VNFs) are network functions which are implemented on hardware. Examples of VNFs include a variety of functions typically performed by network equipment: switching, functionalities of mobile network nodes, tunneling gateway functions, traffic analysis, signaling, policy (e.g., authentication, authorization and accounting), application-level optimizations (e.g., content delivery networks, load balancers), and security functions (e.g., firewalls, intrusion detection systems). Together, the VNFs form a Network Functions Virtualization Infrastructure (NFVI). Network Functions Virtualization Management and Orchestration Architectural Framework (NFV-MANO Architectural Framework) includes nodes which orchestrates the NFVI and VNFs therein.

Traditionally, the orchestration of NFV system relies on a centralized management entity to perform imperative configuration targeting southbound VNF or Physical Network Function (PNF) and NVFI, as exemplified by European Telecommunications Standards Institute (ETSI) MANO reference architecture, open source implementation such as OpenContrail, as well as OpenDaylight (ODL) and other commercial OpenFlow based Software Defined Network (SDN) controllers. While the existing centralized approach provides adequate support for physical and virtual machine based network deployment in certain applications, it presents an architectural bottleneck hindering higher scalability and variability of services as the central entity unavoidably becomes the choke point of system performance and complexity. With the rapid growth of container based workload and service functions, the need of a better design to cope with new levels of scale and complexity becomes increasingly important in the competitive technology and market landscape. In particular, at the provider edge for small/medium businesses (SMB) or residential services and in massively scalable data center (MSDC) deployments, it is commonly required to support tens of thousands of VNFs with high level of per-tenant customization variability, based on service provider customer feedback.

Consider a typical NFV deployment scenario at the service provider (SP) edge, where the traditional residential/SMB physical customer premise equipment (CPE) functions and corresponding on-premise services are transitioning over to provider cloud, the management and orchestration (MANO) functionality involves setting up the physical CPEs (pCPEs), any virtual CPEs (vCPEs), virtualized services (SVCs), and corresponding networking connectivity in the provider data center. The MANO functionality, i.e., provisioning of pCPEs, vCPEs, SVCs, and network connectivity, is performed with a central entity, i.e., a single orchestrator.

FIG. 1 illustrates an exemplary NFVI with centralized orchestration. The centralized orchestration entity is shown as centralized orchestrator 101. The centralized orchestrator 101 can manage a NFVI, which includes virtualized network functions. Implementing virtualized network functions can involve provisioning virtualized resources such as vCPEs (shown as vCPE11, vCPE12, vCPE13, and vCPE14), virtualized services (shown as SVC21, SVC22, and SVC23), and virtual switches (shown as vSW1 and vSW2). These virtualized resources are provisioned on physical hardware (shown as H1 and H2). The physical hardware on which the virtualized resources are instantiated (e.g., H1 and H2) can include physical compute, storage, and/or network resources. The virtualized resources, in some cases, can be instantiated as virtual machines (each having a virtualized application and operating system implemented on physical hardware) and/or as containers (virtualized applications implemented on shared operating systems). Implementing virtualized network functions can also involve physical resources. The physical resources can include pCPEs (shown as pCPE1 and pCPE2). Interconnected communication networks (e.g., access network 120, broadband remote access server or broadband network gateway 121 (BRAS/BNG), Internet 122, and data center network 123) and physical switch(es) (e.g., top of rack physical switch (TOR pSW) 124) provide communication connectivity between the virtualized resources and physical resources.

One approach is to control the constituent southbound entities (e.g., pCPEs, vCPEs, virtual switches, and virtualized services seen in FIG. 1) using a centralized MANO component, i.e., the centralized orchestrator 101. The centralized MANO entity serves as the focal point of command-and-control in provisioning and managing the southbound entities and the NFVI provisioned on top of the southbound entities. For instance, centralized orchestrator 101 can manage pCPEs, e.g., pCPE1 and pCPE2, using pCPE control messages 104. Centralized orchestrator 101 can manage virtualized switches (e.g., vSW1 and vSW2) using virtual/physical (V/P) network provisioning messages 102. Centralized orchestrator 102 can manage vCPEs, e.g., vCPE11, vCPE12, vCPE13, and vCPE14 using vCPE control messages 105. Centralized orchestrator 101 can manage virtualized services SVCs, e.g., SVC21, SVC22, and SVC23, using SVC control messages 106. Besides having the management functions at the centralized orchestrator 101, any configuration information for the network functions has to be maintained and managed at the centralized orchestrator 101.

Another architecture is to leverage logically centralized SDN controller to program the southbound forwarders in response to northbound provisioning requests (proactive model) or as a result of the detection of new data flows (reactive model).

Although both approaches provide adequate function at low scale and limited service variability, they suffer the following common deficiencies: centralization of the control functionalities and managed information, centralization of complexity/run-time overhead of the session and transaction management, lack of integration flexibility for new service functions/technologies due to monolithic design.

Improved Approach to NFV Orchestration

Figure 2:
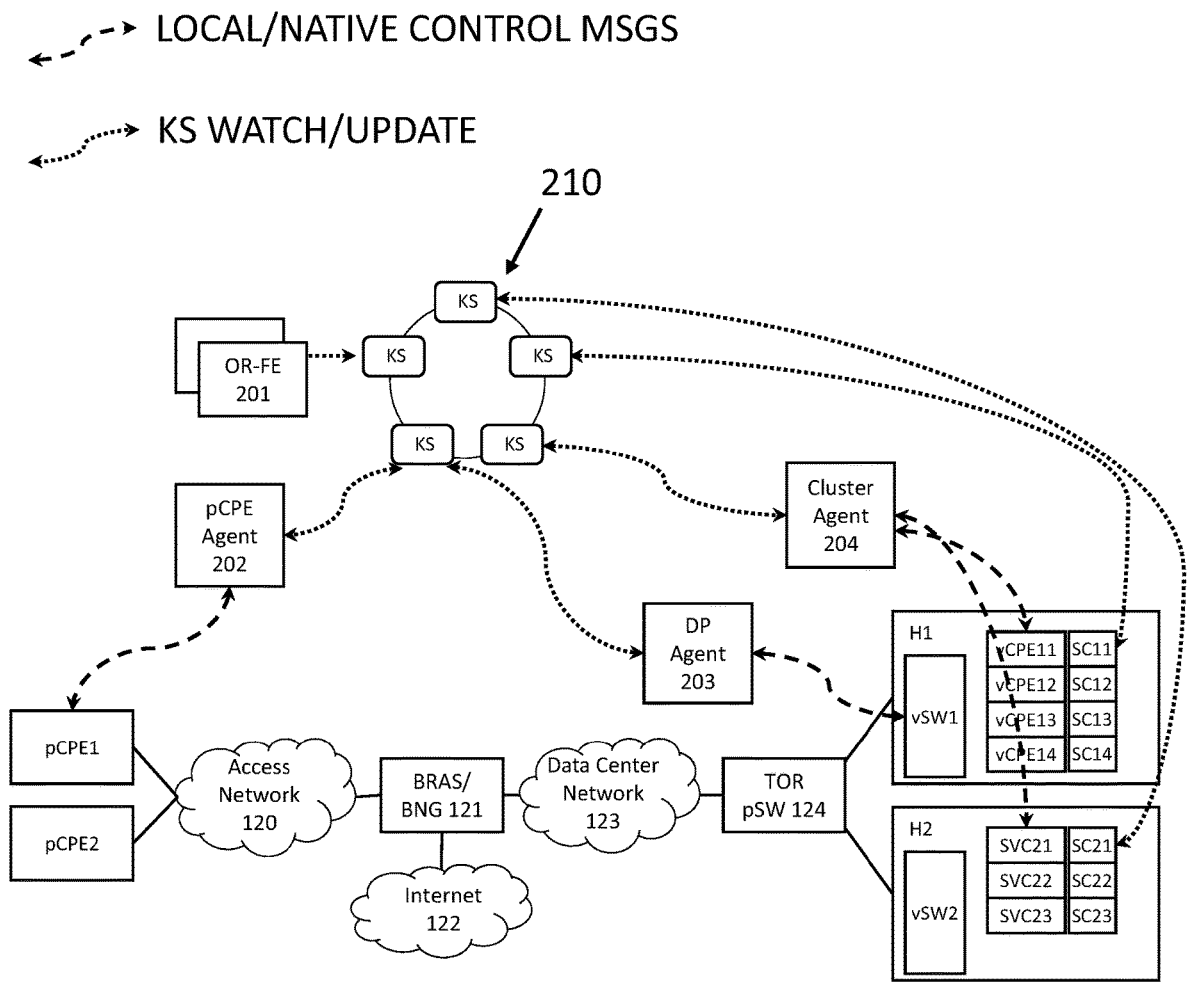
FIG. 2 illustrates decentralized network functions virtualization orchestration, according to some embodiments of the disclosure.

To address some of the shortcomings of the centralized NFV orchestration approaches, an improved orchestration system is described. FIG. 2 illustrates decentralized NFV orchestration, according to some embodiments of the disclosure. The decentralized NFV orchestration system decouples and distributes the MANO functions into the following (distributed) components:

- a set of one or more lightweight orchestration front-end applications (OR-FE)
- a set of distributed back-end agents,
- a distributed key store cluster (KS) with declarative service descriptors, and
- an event data pipeline for fault/performance management.

A subscriber can submit service level requests to OR-FE 201. Service level requests can be associated with the provisioning and management of virtualized network functions. For example, a service level request can request to provision a virtualized network function. A lightweight orchestration front-end application, e.g., OR-FE 201 seen in FIG. 2, serves as the northbound interface (NBI) for service level requests. The OR-FE 201 can receive a request to provision a virtualized network function. Furthermore, the OR-FE 201 can translate the service level requests into per-subscriber service descriptors.

Translating service level requests to service descriptors is not trivial, since it is not immediately clear to one skilled in the art how the MANO functions of virtualized network functions can be distributed. To distribute the MANO functions, the OR-FE creates service descriptors for the request according to the virtualized network function, where the service descriptors has a hierarchy of information elements organized based on distributed back-end agents operable to provision and manage the virtualized network function. An information element can includes configuration information for the virtualized network function. Moreover, the OR-FE stores the service descriptors having the hierarchy of information elements a distributed data store. Creating a hierarchy of information elements decouples information associated with the MANO functions into constituent pieces, i.e., information elements, which distributed back-end agents can independently monitor and/or operate on. As a result, the MANO functions for provisioning and managing a virtualized network function can be handled in a distributed manner.

Generally speaking, the resulting service descriptors, organized as a hierarchy of information elements, describe both service and connectivity information required by the service instantiation. The hierarchy of information elements can be determined by decomposing the virtualized network function into parts of a networking problem (or simply referred to as "the problem"). The distributed back-end agents can have a common goal of building the virtualized network function, i.e., collaborating to solve the problem. For instance, a virtualized network function can be decomposed into multiple network links which make up the network graph associated with implementing the virtualized network function. One or more distributed back-end agents can be an expert in determining and providing information needed to setup a part of the virtualized network function. For instance, a network link and/or end points of the network link may require overlay information and underlay information, and experts responsible for the overlay information and experts responsible for the underlay information may collaborate to determine the information required for the network link. Working to collaborate to implement the virtualized network function, one or more distributed back-end agents can be an expert for determining and updating a particular information element that can be used for setting up a particular part of the virtualized network function.

Besides decomposing the virtualized network function into constituent parts, the hierarchy of information elements also forms an event data pipeline, or simply, a data pipeline. The data pipeline has stages of information elements, and where the stages can have progressively more specific information for provisioning and managing a virtualized network function. The distributed back-end agents, acting as experts, can resolve varying levels of a problem to collaborate on building the virtualized network function. The varying levels of the problem can correspond to the different stages of the data pipeline. Distributed back-end agents can have different roles or associated operations on different stages or information elements in the data pipeline. A particular distributed back-end agent can be responsible for creating a given information element. The given information element can trigger another distributed back-end agent to create a further (more specific) information element. In some cases, the given information element can also trigger the particular distributed back-end agent to perform an action using the given information element. A distributed back-end agent can also be subscribed to a given information element, e.g., watch for changes to the given information element and perform an action in response to changes made to the information element accordingly. When provisioned properly, the data pipeline provides autonomous work flows for provisioning and managing the virtualized network function in a distributed fashion. This multi-level property of the hierarchy of information elements enables distributed provisioning of a virtualized network function based on a forward-direction set of actions triggered by the data pipeline. This multi-level property also enables distributed state updates of a virtualized network function based on a set of updates propagating in a reverse-direction of the data pipeline. Both the forward-direction actions and reverse-direction updates can occur autonomously and intelligently by virtue of the hierarchy of information elements being arranged with an event data pipeline.

Not all virtualized network functions can be decomposed and organized into a same hierarchy of information elements. To accommodate different kinds of virtualized network functions that could be requested by subscribers, the OR-FE 201 can determine a category to which the virtualized network function belong, and determining the hierarchy of information elements based on a template associated with the category. The template can specify the data pipeline suitable for the category of virtualized network functions. For instance, the template can specify the distributed back-end agents and an organization for the hierarchy. The organization of the hierarchy can specify the forward-direction actions and reverse-direction updates for the hierarchy of information elements.

Besides organizing the service and network connectivity into service descriptors having the hierarchy of information elements, service descriptors are advantageously maintained in a distributed data store. Instead of using traditional messaging based or application programming interface (API) based approaches, which require distributed transaction management, the decentralized NFV orchestration system utilizes a distributed data store 210 (abbreviated as "KS" herein) to maintain the service descriptors, i.e., the hierarchy of information elements. Distributed data store 210 can provide robust distributed storage of the service descriptors, and different information elements can be independently accessible by the distributed back-end agents operating on them. One exemplary platform for implementing the distributed data store (e.g., a distributed key-value store as the KS) is etcd, and other distributed data stores can be used.

Referring back to FIG. 2, the distributed back-end agents includes pCPE Agent 202, DataPath (DP) Agent 203, Cluster Agent 204, and optionally Side-Car (SC) agents (e.g., SC11, SC12, SC13, SC14, SC21, SC22, and SC23). The distributed back-end agents can be experts for implementing a virtualized network function. In some embodiments, the distributed back-end agents can include TR-069 or Automatic Configuration Server (ACS) device agent (as the pCPE Agent 202), Kubernetes Cluster Agent (as the Cluster Agent 204), Data Path (DP) Agent 203 for overlay flow programming. The SC agents can include a set of per-tenant (container-based) side-car (SC) "micro-agents" tailored for subscriber service customization. As shown, SC agents can be provided per vPCE (e.g., SC11 for vCPE11, SC12 for vCPE12, SC13 for vCPE13, and SC14 for vCPE14) and per virtualized services (e.g., SC21 for SVC21, SC22 for SVC22, and SC23 for SVC23).

The distributed back-end agents can provide localized or specialized functions, as experts to the problem, to program or configure network elements (physical or virtual), e.g., specific southbound entities, based on the information elements (i.e., declarative descriptors) in the KS. The decoupling of provisioning flow and service descriptors provides design flexibility whereby the agents can watch, retrieve, throttle and/or batch process the incoming requests as well as report operational results to data pipeline autonomously.

To provide end-to-end (E2E) service integrity and performance monitoring, the data pipeline can be used to collect events and/or statistics from OR-FE and distributed back-end gents and to communicate with external Operational Support System (OSS) or Operations, Administration, and Maintenance (OAM) systems. The collection of events and/or statistics to update the distributed data store 210 can occur through KS watch and update operations (shown as "KS WATCH/UPDATE" arrows in FIG. 2). The distributed back-end agents can cooperate with the southbound entities, and possibly external OSS or OAM systems (not shown in FIG. 2), through local or native control messages (shown as "LOCAL/NATIVE CONTROL MSGS" arrows in FIG. 2) to facilitate provisioning and management of the virtual network function.

Event Data Pipeline

Figure 3:
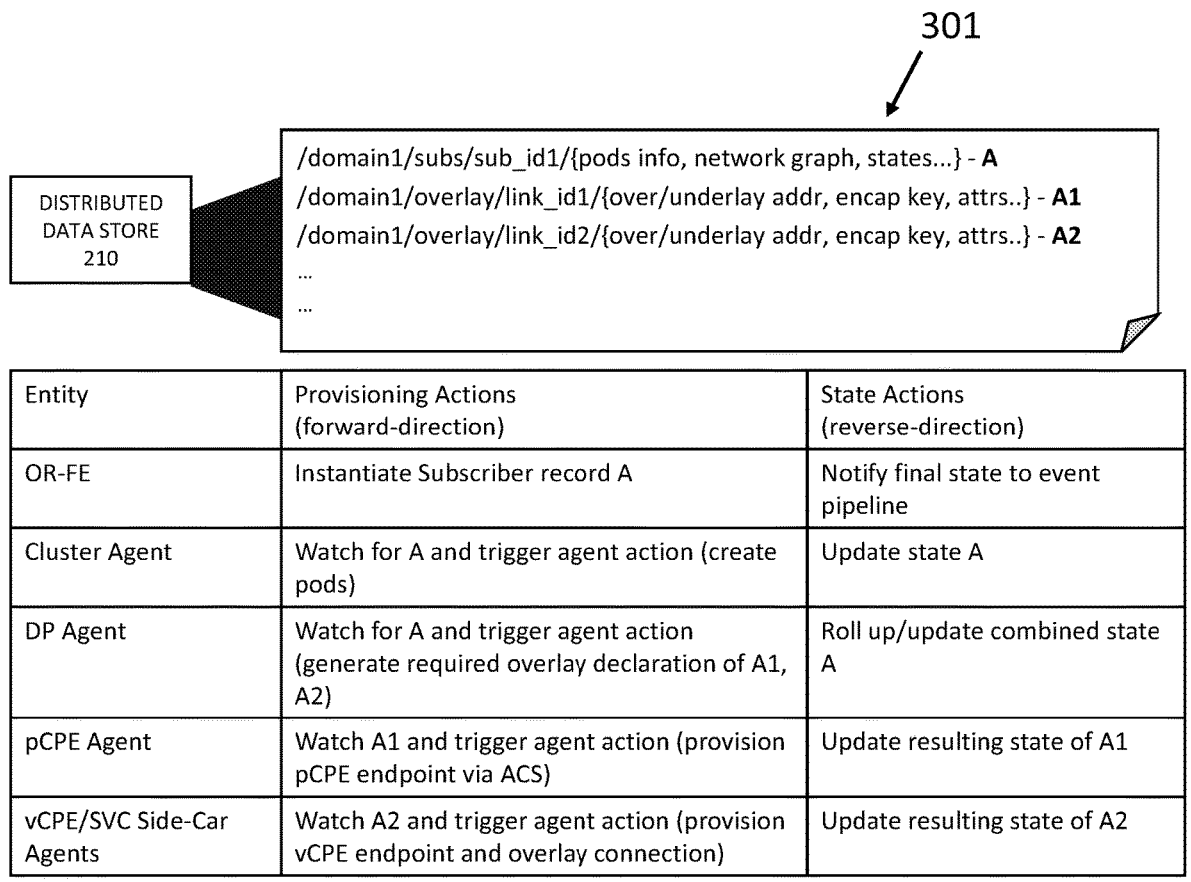
FIG. 3 illustrates an example of service descriptors forming a data pipeline, according to some embodiments of the disclosure.

FIG. 3 illustrates an example of service descriptors forming a data pipeline, according to some embodiments of the disclosure. As discussed previously, a distributed data store can store service descriptors having a hierarchy of information elements. Generally speaking, service descriptors can include domain and subscriber information. The domain and subscriber information can be embedded in the information elements. Information elements can describe configuration information for provisioning the virtual service function. An information element can include one or more of the following: domain information, subscriber information, service information, and network information.

For illustration, FIG. 3 shows an exemplary hierarchy of information elements 301 for provisioning and managing a two-segment Generic Routing Encapsulation (GRE) tunnel as the virtualized network function. The example is for illustration purposes only, and is not intended to limit the scope of the disclosure or the claims. The exemplary hierarchy of information elements 301 includes a top-level information element A and at least two sub-level information elements A1 and A2. The top-level information element A forms a first stage of the data pipeline, and the sub-level information elements A1 and A2 form a second stage of the data pipeline. Actions and updates are prescribed for the hierarchy of information elements to form an event data pipeline.

In some embodiments, the hierarchy of information elements comprises a top-level information element (e.g., information element A) having an identifier for a subscriber associated with the request (e.g., "sub_id1"), and information specifying a network graph to provision the virtualized network function ("network graph"). In the example shown, information element A includes domain information and subscriber information, e.g., /domain1/subs/sub_id1/. Furthermore, the top-level information element A can include service information (e.g., "pods info"), and state information (e.g., "states"). The sub-level information elements have more specific information for the virtualized network function, such as link identifiers (e.g., "link_id1", and "link_id2"), overlay or underlay addresses (e.g., "over/underlay addr"), encapsulation keys (e.g., "encap key"), and attributes ("attrs").

As described previously, the data pipeline has forward-direction actions and reverse-direction (state) updates. The column labeled "Provisioning Actions (forward-direction)" illustrates exemplary forward-direction actions of the data pipeline, and the column labeled "State Actions (reverse-direction)" illustrates exemplary reverse-direction updates. The two columns make up event flows having operations of the OR-FE and distributed back-end agents. Each distributed back-end agent can perform watch-react operations. Each entity, i.e., any one of the OR-FE and the distributed back-end agents (seen in the column labeled "Entity"), has corresponding provisioning actions in the forward-direction and (state) update actions in the reverse-direction.

The OR-FE can initiate subscriber record (or information element) A. For instance, OR-FE can create or request to create a top-level information element A for the virtualized network function. The top-level information element A serves as a starting point for the provisioning actions in the forward-direction. One or more distributed back-end agents can watch this top-level information element A and react accordingly. This watch-react operation can occur at any one level of the data pipeline. For instance, the Cluster Agent A can watch for information element A and trigger an agent action, e.g., create pods. An agent action can involve cooperating with a network element to provision at least a part of the virtualized network service using the information in the information element which triggered the agent action. Broadly speaking, a distributed back-end agent can watch an information element of the hierarchy of information elements in the distributed data store, and the distributed back-end agent can be triggered to provision one or more network elements according to information specified in the information element. In another instance, the DP Agent can watch for information element A and trigger its own agent action, e.g., generate require overlay declaration of A1, and A2. In broader terms, the data pipeline can trigger creating sub-level information elements (e.g., A1 and A2) under the top level information element (A). Further distributed back-end agents can operate on (e.g., watch and/or react on) the one or more sub-level information elements. In the example shown, the pCPE Agent watches information element A1 and trigger an agent action, e.g., provision pCPE endpoint via ACS. The vCPE/SVC SideCar Agents can watch information element A2 and trigger an agent action, e.g., provision vCPE endpoint and overlay connection.

The data pipeline also operates in the reverse-direction. A distributed back-end agent can obtain and/or receive updated state information associated with an information element of the hierarchy of information element in the distributed data store, and update the information element based on the updated state information. As seen in the example, pCPE Agent can update resulting state of information element A1, and vCPE/SVC Side-Car Agents can update resulting state of information element A2. DP Agent can roll up or update the combined state of information element A based on updates occurring in information elements A1 and/or A2. Cluster Agent can (independently) update state of information element A. OR-FE can notify final state to event pipeline. Broadly speaking, a distributed back-end agent being the expert in the part of the problem, i.e., a particular information element, can update the particular information element independently. The data pipeline enables updates to propagate appropriately in the reverse-direction autonomously. As a whole, many distributed back-end agents can then collaborate together to orchestrate the virtualized network function.

In some embodiments, the distributed back-end agent (being the expert) is responsible for updating information elements. For instance, pCPE Agent and Side-Car agents can update information elements in the distributed data store if the agents see changes in the configuration of the virtualized network function. In some embodiments, the information elements are immutable (not modifiable by the back-end agents), and a separate entity can be provided to monitor the state information and update the information elements in the distributed data store.

Exemplary Use Cases: Bulk Upgrade and Self-Healing

To understand the benefit of the decentralized NFV orchestration system, consider a software upgrade involving bulk deletion and re-creation of service instances.

Figure 4:
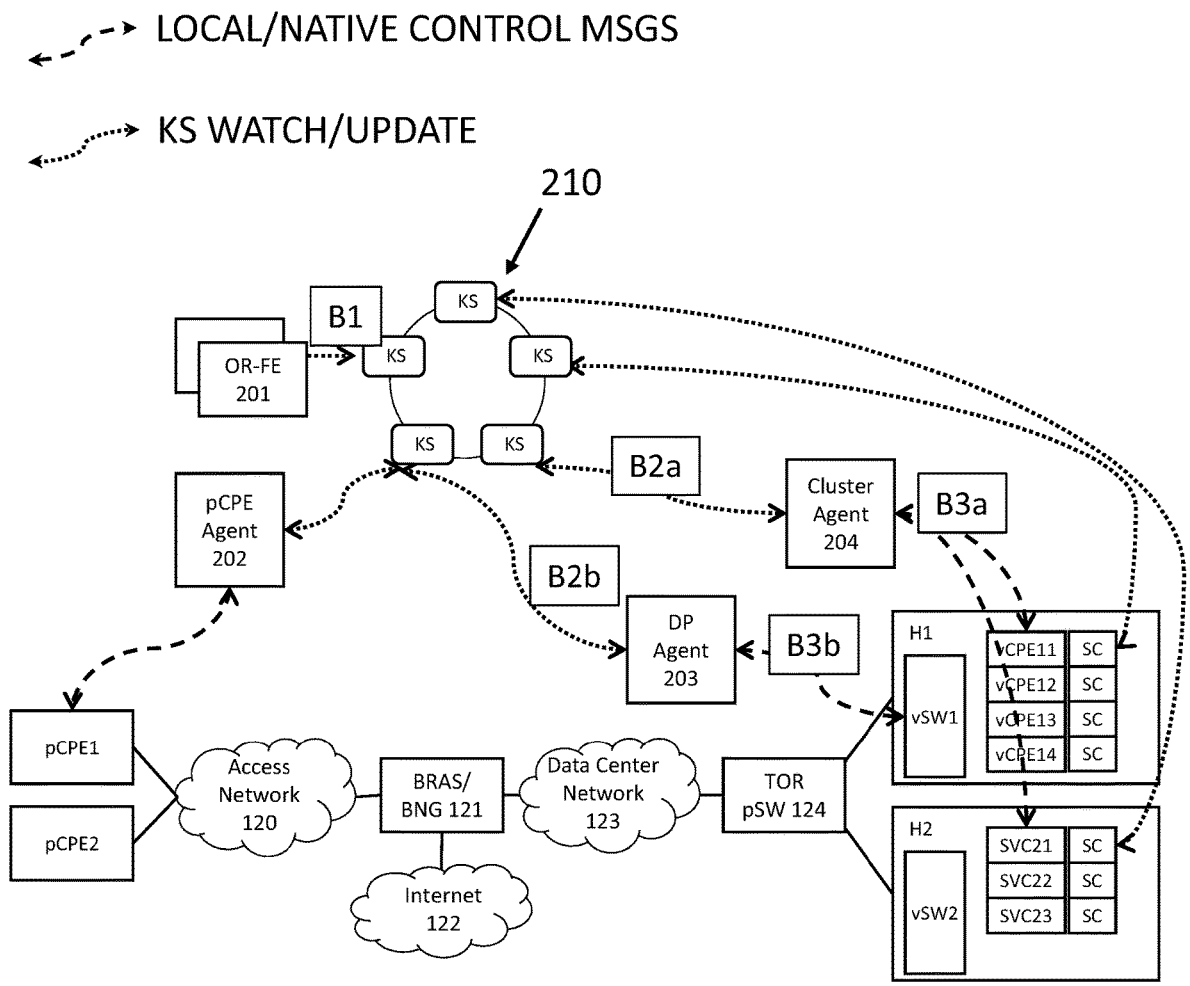
FIG. 4 illustrates a bulk upgrade use case, according to some embodiments of the disclosure.

FIG. 4 illustrates a bulk upgrade use case, according to some embodiments of the disclosure, Unlike the traditional approach where the centralized entity is required to handle massive control flows of per-service-instance upgrade requests/responses with southbound entities (due to the inherent design of control and provisioning information coupling), the decentralized NFV orchestration system requires only the update of the relevant service descriptors (see B1) and allows subsequent agent operations to occur autonomously as a side effect (see B2a, B2b, B3a, B3b). The OR-FE 201 can receive a request to update of information elements (B1). Through the event data pipeline, the changes can propagate in the forward direction. For instance, Cluster Agent 204 and DP Agent 203 can watch certain information elements (B2a and B2b) in the distributed data store 210, and trigger agent actions involving sending local/native control messages that modify the provisioning/configuring of network elements (B3a and B3b).

Figure 5:
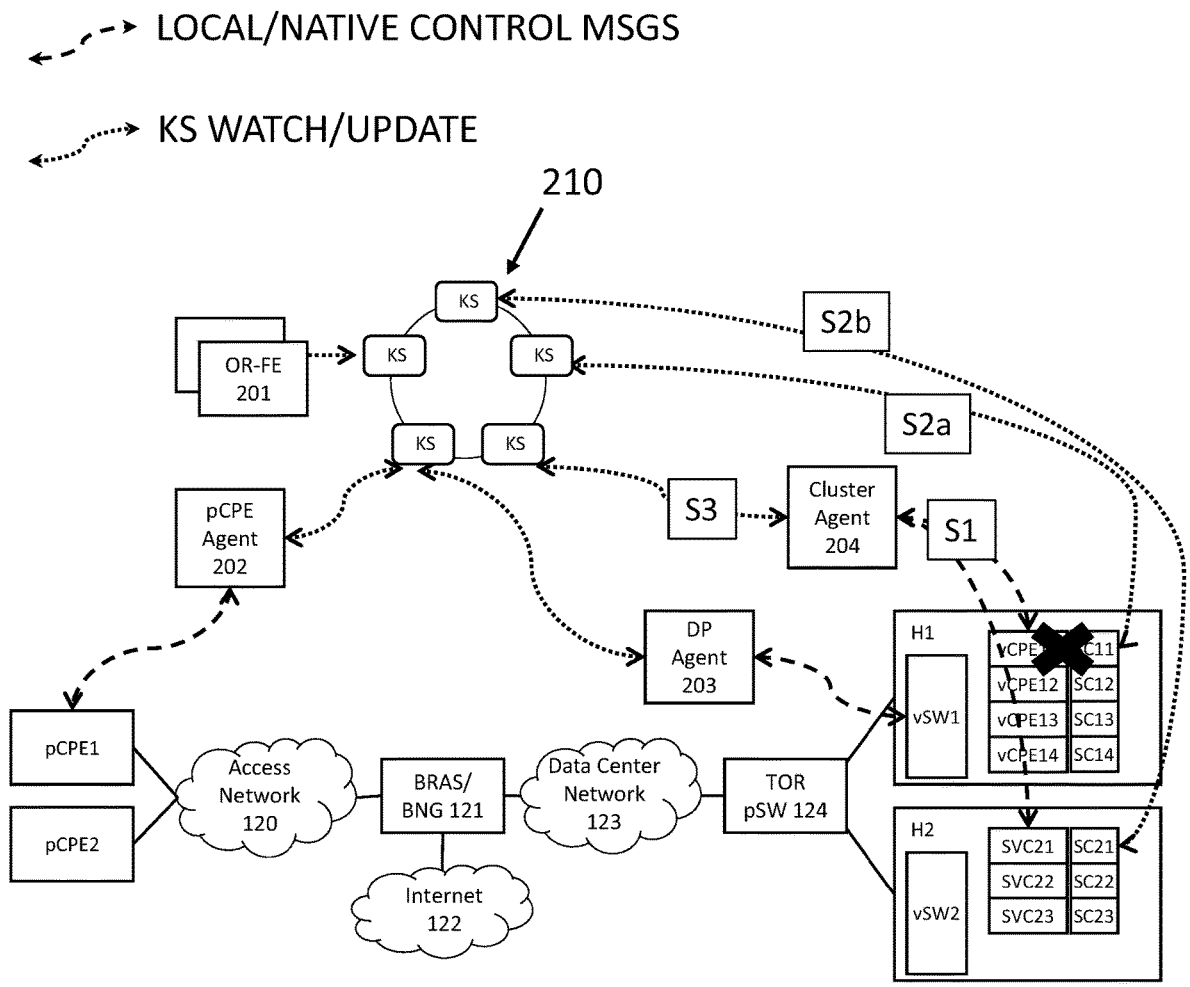
FIG. 5 illustrates a self-healing use case, according to some embodiments of the disclosure.

The strength of the system can also be observed through a self-healing use case. FIG. 5 illustrates a self-healing use case, according to some embodiments of the disclosure. After local failure detection and relaunch of service (see S1) is initiated by the cluster system, the distributed agents collaborate to recover network connectivity autonomously (see S2a, S2b, S3) by having appropriate back-end agents retrieving and updating relevant service data in the distributed data store 210, without any involvement from OR-FE 201. For instance, SC11 and SC21 could detect a change in vCPE11 and SVC21 respectively, and SC11 and SC21 can update the appropriate information element(s) in the distributed data store 210 (see S2a and S2b). In some cases, through local/native control messages, Cluster Agent 204 can detect the change and update the appropriate information element(s) in the distributed data store 210 (see S3).

Exemplary Method

Figure 6:
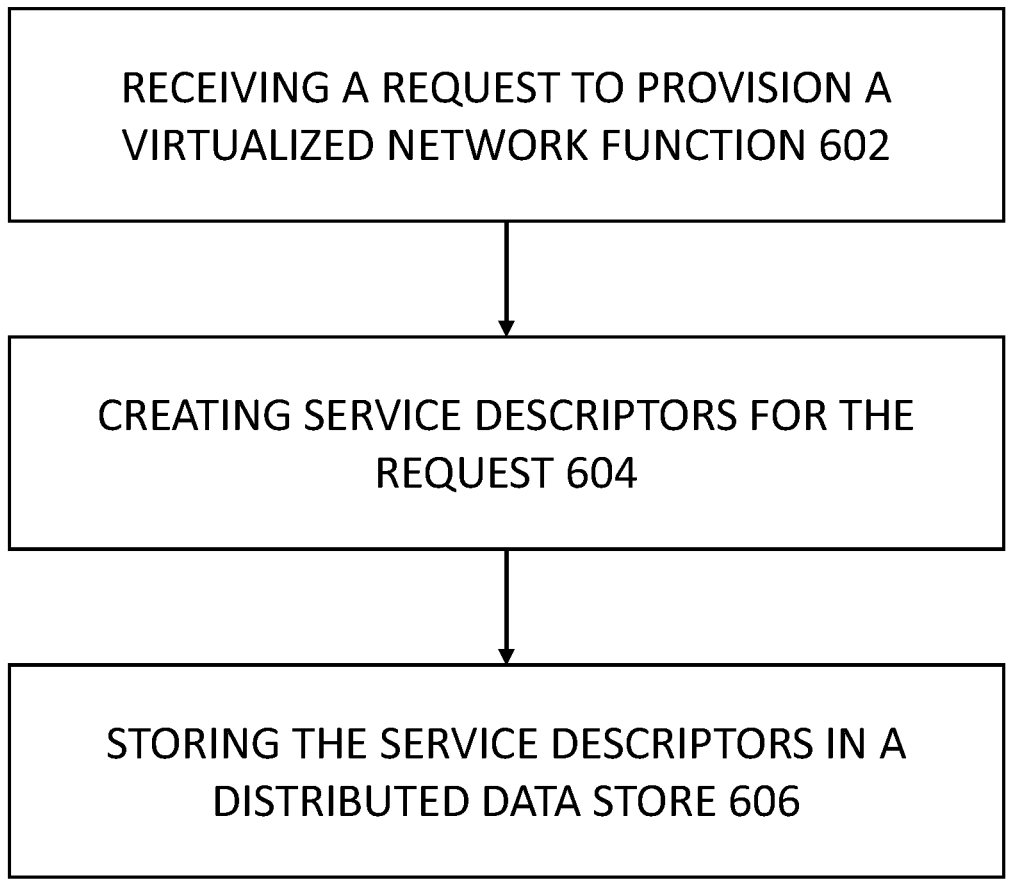
FIG. 6 depicts a flow diagram illustrating a method for distributed network function virtualization orchestration, according to some embodiments of the disclosure.

FIG. 6 depicts a flow diagram illustrating a method for distributed network function virtualization orchestration, according to some embodiments of the disclosure. In 602, an OR-FE application can receive a request to provision a virtualized network function. In 603, the OR-FE can create service descriptors for the request according to the virtualized network function. The service descriptors can include a hierarchy of information elements organized based on distributed back-end agents operable to provision and manage the virtualized network function. In 604, the service descriptors are stored in a distributed data store.

Exemplary System

Figure 7:
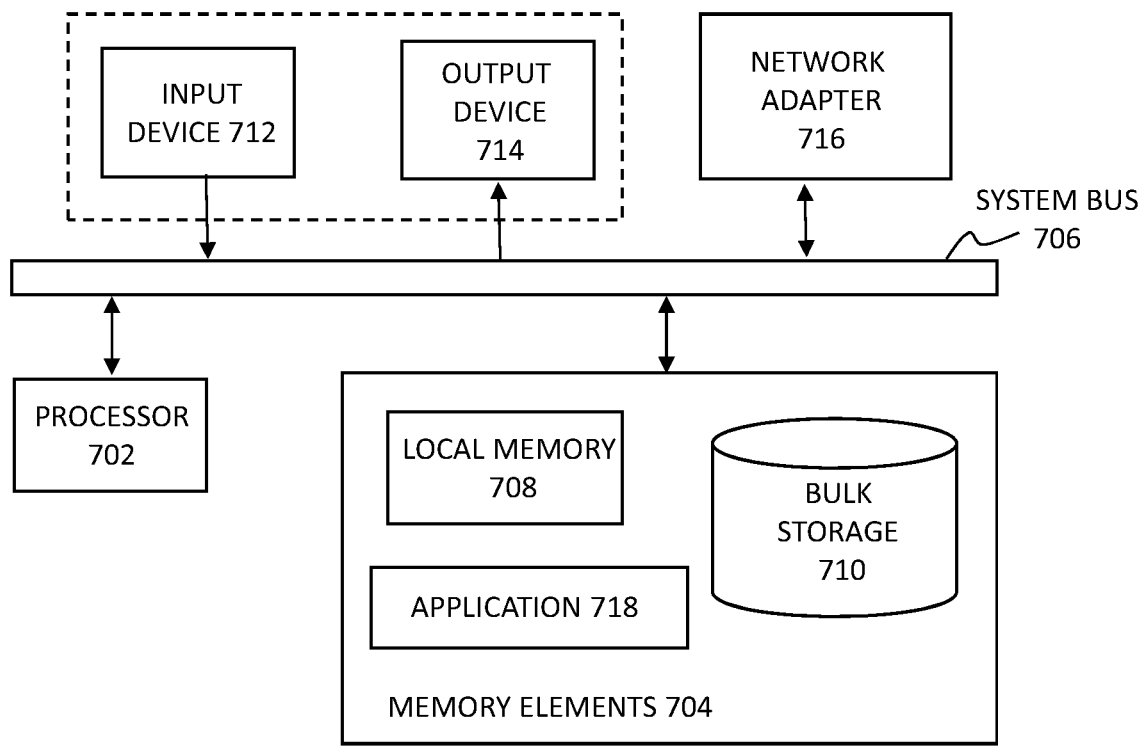
FIG. 7 depicts a block diagram illustrating an exemplary data processing system that may be used to implement the functionality of decentralized NFV orchestration, according to some embodiments of the disclosure.

FIG. 7 depicts a block diagram illustrating an exemplary data processing system 700 (sometimes referred herein as a "node") that may be used to implement the functionality associated with decentralized NFV orchestration, according to some embodiments of the disclosure. For instance, the OR-FE, the distributed back-end agents (including the agents and the side-cars agents), may have one or more of the components of the system 700 or their functionalities may be implemented with one or more components of system 700. The distributed data store 210 may also have one or more components of system 700.

As shown in FIG. 7, the data processing system 700 may include at least one processor 702 coupled to memory elements 704 through a system bus 707. As such, the data processing system may store program code within memory elements 704. Further, the processor 702 may execute the program code accessed from the memory elements 704 via a system bus 707. In one aspect, the data processing system may be implemented as a computer that is suitable for storing and/or executing program code. It should be appreciated, however, that the data processing system 700 may be implemented in the form of any system including a processor and a memory that is capable of performing the functions described within this specification.

The memory elements 704 may include one or more physical memory devices such as, for example, local memory 708 and one or more bulk storage devices 710. The local memory may refer to random access memory or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution.

Input/output (I/O) devices depicted as an input device 712 and an output device 714 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 717 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

As pictured in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

Persons skilled in the art will recognize that while the elements 702-718 are shown in FIG. 7 as separate elements, in other embodiments their functionality could be implemented in lesser number of individual elements or distributed over a larger number of components.

In some embodiments, one or more parts of the orchestration system (e.g., the OR-FE, and back-end agents including the agents and side-cars) can be implemented as one or more containers, which are virtualized on physical hardware (e.g., components seen in FIG. 7). In some embodiments, the VNFs implemented as containers. Containers comprises an application for carrying out the functionalities disclosed herein (e.g., such as the operations illustrated in FIG. 3), any possible dependencies, any needed libraries, any needed binaries, and any needed configuration files. Containers are can be instantiated as a package having the application, and the container is associated with a corresponding operating system (which may be share with other applications) that is needed for executing the application. In some embodiments one or more parts of the orchestration system and/or the VNFs are implemented virtual machines, which are virtualized on physical hardware (e.g., components seen in FIG. 7). In contrast to containers, virtual machines includes both the application and the corresponding operating system (not shared by multiple applications) as a single package.

Examples

Example 1 is a method for distributed network function virtualization orchestration, comprising: receiving a request to provision a virtualized network function; creating service descriptors for the request according to the virtualized network function, the service descriptors comprising a hierarchy of information elements organized based on distributed back-end agents operable to provision and manage the virtualized network function; and storing the service descriptors in a distributed data store.

In Example 2, Example 1 can further include creating service descriptors comprising: determining a category to which the virtualized network function belong; and determining the hierarchy of information elements based on a template associated with the category, wherein the template specifies the distributed back-end agents and an organization for the hierarchy.

In Example 3, Example 1 or 2 can further include the hierarchy of information elements comprising a top-level information element having an identifier for a subscriber associated with the request, and information specifying a network graph to provision the virtualized network function.

In Example 4, any one of Examples 1-3 can further include the hierarchy of information elements forming a data pipeline, and each distributed back-end agent being subscribed to an information element in the hierarchy.

In Example 5, any one of Examples 1-4 can further include creating the hierarchy of information elements comprising: creating a top-level information element for the virtualized network function; and creating one or more sub-level information elements under the top level information element, wherein the distributed back-end agents operate on the one or more sub-level information elements.

In Example 6, any one of Examples 1-5 can further include: watching, by a first distributed back-end agent, a first information element of the hierarchy of information elements in the distributed data store; and triggering, the first distributed back-end agent, to provision one or more network elements according to information specified in the first information element.

In Example 7, any one of Examples 1-6 can further include: receiving updated state information associated with a second information element of the hierarchy of information elements in the distributed data store; and updating the second information element based on the updated state information.

Example 8 is a system for distributed network function virtualization orchestration, the system comprising: at least one memory element; at least one processor coupled to the at least one memory element; and an front-end application that when executed by the at least one processor is configured to: receive a request to provision a virtualized network function; create service descriptors for the request according to the virtualized network function, the service descriptors comprising a hierarchy of information elements organized based on distributed back-end agents operable to provision and manage the virtualized network function; and store the service descriptors in a distributed data store.

In Example 9, Example 8 can further include: the front-end application creating service descriptors by determining a category to which the virtualized network function belong, and determining the hierarchy of information elements based on a template associated with the category; and the template specifying the distributed back-end agents and an organization for the hierarchy.

In Example 10, Example 8 or 9 can further include the hierarchy of information elements comprising: a top-level information element having an identifier for a subscriber associated with the request, and information specifying a network graph to provision the virtualized network function.

In Example 11, any one of Examples 8-10 can further include the hierarchy of information elements forming a data pipeline, and each distributed back-end agent is subscribed to an information element in the hierarchy.

In Example 12, any one of Examples 8-11 can further include: the front-end application creating service descriptors by creating a top-level information element for the virtualized network function, and creating one or more sub-level information elements under the top level information element; and the distributed back-end agents operating on the one or more sub-level information elements.

In Example 13, any one of Examples 8-12 can further include a first distributed back-end agent that when executed by the at least one processor being configured to: watch a first information element of the hierarchy of information elements in the distributed data store; and trigger to provision one or more network elements according to information specified in the first information element.

In Example 14, any one of Examples 8-13 can further include the front-end application being further configured to: receive updated state information associated with a second information element of the hierarchy of information elements in the distributed data store; and update the second information element based on the updated state information.

Example 15 has one or more computer-readable non-transitory media comprising one or more instructions, for distributed network function virtualization orchestration, that when executed on a processor configure the processor to perform one or more operations in any one of Examples 1-7.

Example 16 is an apparatus comprising means for implementing and/or carrying out the methods in any one of Examples 1-7.

Advantages, Variations, and Implementations

The decentralized NFV orchestration system has salient performance and density improvement at scale. For instance, the orchestration system can handle upgrading 200 vCPEs on 2 vCPU in tens of seconds with unnoticeable video stream disruption during service restart. Broadly speaking, the distributed NFV (and container based application) orchestration has lightweight common service frontend, distributed agents, declarative data store (e.g., a distributed key store), and event pipeline. The system can have one or more of the following advantages:

Asynchronous distributed control plan enables decoupling of traditional hub-spoke control flow into two-phase key store and agent operations;

Significant performance and scale improvement over centralized MANO solutions;

Ease of composition, customization and distribution with service descriptor and micro service container-based design; and Extensible to hybrid environment with both container and VM based VNFs.

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the disclosure can be associated with a service provider deployment. In other examples, the architecture of the disclosure would be equally applicable to other communication environments, such as an enterprise wide area network (WAN) deployment. The architecture of the disclosure may include a configuration capable of transmission control protocol/internet protocol (TCP/IP) communications for the transmission and/or reception of packets in a network.

As used herein, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the symmetric routing operations thereof. This may be inclusive of appropriate algorithms and communication protocols that allow for the effective exchange of data or information.

As used herein, the term "packet" (which may be used interchangeably with the term "message") refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the FIGURES, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

In one implementation, network elements implementing decentralized NFV orchestration as described herein may include software to achieve (or to foster) the functions discussed herein, where the software is executed on one or more processors to carry out the functions. Additionally, each of these elements can have an internal structure (e.g., a processor, a memory element, etc.) to facilitate some of the operations described herein. In other embodiments, these functions of decentralized NFV orchestration may be executed externally to these elements, or included in some other network element to achieve the intended functionality. Alternatively, network elements implementing the functionality of decentralized NFV orchestration as described herein may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, functions related to decentralized NFV orchestration outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store distributed key store disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in decentralized NFV orchestration, as outlined herein. Additionally, each of these devices may include a processor that can execute software or an algorithm to perform the activities for decentralized NFV orchestration as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of ensuring symmetric routing, as potentially applied to a myriad of other architectures.

It is also important to note that the steps of methods/algorithms described herein illustrate only some of the possible scenarios that may be executed by, or within, an environment decentralized NFV orchestration described herein. Some of these steps may be deleted or removed where appropriate, or these steps may be modified or changed considerably without departing from the scope of the disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings of the disclosure.

It should also be noted that many of the previous discussions may imply a single client-server relationship. In reality, there is a multitude of servers in the delivery tier in certain implementations of the disclosure. Moreover, the disclosure can readily be extended to apply to intervening servers further upstream in the architecture, though this is not necessarily correlated to the 'm' clients that are passing through the 'n' servers. Any such permutations, scaling, and configurations are clearly within the broad scope of the disclosure.

Numerous other changes, substitutions, variations, alterations, and modifications may be ascertained to one skilled in the art and it is intended that the disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for decentralized network function virtualization orchestration, the method comprising:
   receiving, at a front-end application, a request to provision a virtualized network function;
   creating, by the front-end application, service descriptors for the request according to the virtualized network function,
   modifying, by one or more distributed back-end agents, at least one service descriptor of the service descriptors,
   wherein the service descriptors comprising a hierarchy of information elements organized based on the one or more distributed back-end agents of a plurality of distributed back-end agents operable to provision and manage the virtualized network function,
   wherein the hierarchy is based on a template, and the template specifies the one or more distributed back-end agents and specifies one or more forward-direction actions and one or more reverse-direction updates for the hierarchy of information elements,
   wherein the hierarchy forms an event data pipeline configured to collect events from the front-end application and the distributed back-end agents, and the event data pipeline including stages of the information elements, each stage including progressively more specific information for the one or more forward-directions actions and the one or more reverse-direction updates,
   wherein the one or more forward-directions actions are provisioning actions and the one or more reverse-direction updates are state actions; and
   storing the service descriptors in a distributed key-value data store.

2. The method of claim 1, wherein the creating of the service descriptors comprises:
   determining a category for the virtualized network function; and
   determining the hierarchy based on the template, the template associated with the category and specifying the distributed back-end agents and an organization for the hierarchy.

3. The method of claim 1, wherein the hierarchy includes a top-level information element having an identifier for a subscriber associated with the request and information specifying a network graph to provision the virtualized network function.

4. The method of claim 1, each distributed back-end agent is subscribed to an information element in the hierarchy.

5. The method of claim 1, wherein creating the hierarchy includes:
   creating a top-level information element for the virtualized network function; and
   creating one or more sub-level information elements under the top-level information element, wherein the distributed back-end agents operate on the one or more sub-level information elements.

6. The method of claim 1, further comprising:
   watching, by a first distributed back-end agent, a first information element of the hierarchy in the distributed data store; and
   triggering, the first distributed back-end agent, to provision one or more network elements according to information specified in the first information element.

7. The method of claim 1, further comprising:
   receiving updated state information associated with a second information element of the hierarchy in the distributed data store; and
   updating the second information element based on the updated state information.

8. A system for decentralized network function virtualization orchestration, the system comprising:
   at least one processor;
   a front-end application, executed by the at least one processor, configured to:
      receive a request to provision a virtualized network function, and
      create service descriptors for the request according to the virtualized network function; and
   one or more distributed back-end agents configured to modify at least one service descriptor of the service descriptors,
   wherein, the service descriptors comprising a hierarchy of information elements organized based on the one or more distributed back-end agents of a plurality of distributed back-end agents operable to provision and manage the virtualized network function,
   wherein the hierarchy is based on a template, and the template specifies the one or more distributed back-end agents and specifies one or more forward-direction actions and one or more reverse-direction updates for the hierarchy of information elements,
   wherein the hierarchy forms an event data pipeline configured to collect events from the front-end application and the distributed back-end agents, and the event data pipeline including stages of the information elements, each stage including progressively more specific information for the one or more forward-directions actions and the one or more reverse-direction updates,
   wherein the one or more forward-directions actions are provisioning actions and the one or more reverse-direction updates are state actions; and
   wherein service descriptors are stored in a distributed key-value data store.

9. The system of claim 8,
   wherein,
      the front-end application creates service descriptors by determining a category for the virtualized network function,
      the hierarchy is determined based on the template, and
      the template is associated with the category and specifies the distributed back-end agents and an organization for the hierarchy.

10. The system of claim 8, wherein the hierarchy includes a top-level information element having an identifier for a subscriber associated with the request and information specifying a network graph to provision the virtualized network function.

11. The system of claim 8, wherein each distributed back-end agent is subscribed to an information element in the hierarchy.

12. The system of claim 8, wherein:
   the front-end application creates service descriptors by creating a top-level information element for the virtualized network function, and creating one or more sub-level information elements under the top level information element; and the distributed back-end agents operate on the one or more sub-level information elements.

13. The system of claim 9, further comprising a first distributed back-end agent that when executed by the at least one processor is configured to:
   watch a first information element of the hierarchy in the distributed data store; and
   trigger to provision one or more network elements according to information specified in the first information element.

14. The system of claim 9, wherein the front-end application is further configured to:
   receive updated state information associated with a second information element of the hierarchy in the distributed data store; and
   update the second information element based on the updated state information.

15. One or more computer-readable non-transitory media comprising one or more instructions, for decentralized network function virtualization orchestration that, when executed on a processor, configure the processor to perform one or more operations comprising:
   receiving a request to provision a virtualized network function;
   creating service descriptors for the request according to the virtualized network function;
   modifying, by one or more distributed back-end agents, at least one service descriptor of the service descriptors,
   wherein the service descriptors comprising a hierarchy of information elements organized based on the one or more distributed backend agents of a plurality of distributed back-end agents operable to provision and manage the virtualized network function,
   wherein the hierarchy of information elements are based on a template, and the template specifies the one or more distributed back-end agents and specifies one or more forward-direction actions or one and more reverse-direction updates for the hierarchy of information elements,
   wherein the hierarchy of information elements forms an event data pipeline configured to collect events from the front-end application and the distributed back-end agents, and the event data pipeline including stages of the information elements, each stage including progressively more specific information for the one or more forward-directions actions and the one or more reverse-direction updates,
   wherein the one or more forward-directions actions are provisioning actions and the one or more reverse-direction updates are state actions; and
   storing the service descriptors in a distributed key-value data store.

16. The one or more computer-readable non-transitory media of claim 15, wherein creating service descriptors comprises:
   determining a category to which the virtualized network function belong; and
   determining the hierarchy based on the template, the template associated with the category and specifying the distributed back-end agents and an organization for the hierarchy.

17. The one or more computer-readable non-transitory media of claim 15, wherein the hierarchy includes a top-level information element having an identifier for a subscriber associated with the request and information specifying a network graph to provision the virtualized network function.

18. The one or more computer-readable non-transitory media of claim 15, wherein each distributed back-end agent is subscribed to an information element in the hierarchy.

19. The one or more computer-readable non-transitory media of claim 15, wherein the operations further comprises:
   watching, by a first distributed back-end agent, a first information element of the hierarchy in the distributed data store; and
   triggering, the first distributed back-end agent, to provision one or more network elements according to information specified in the first information element.

20. The one or more computer-readable non-transitory media of claim 15, wherein the operations further comprises:
   receiving updated state information associated with a second information element of the hierarchy in the distributed data store; and
   updating the second information element based on the updated state information.

\* \* \* \* \*